(12) United States Patent
Roeder et al.

(10) Patent No.: US 7,367,607 B2
(45) Date of Patent: May 6, 2008

(54) COVER ASSEMBLY FOR AN OPENABLE ROOF WITH AN ADJUSTABLE LINKAGE FOR A SIDE FLAP

(75) Inventors: Holger Roeder, Eislingen (DE); Holger Wilker, Lauffen (DE)

(73) Assignee: Magna Car Top Systems GmbH (DE)

( * ) Notice: Subject to any disclaimer, the term of this patent is extended or adjusted under 35 U.S.C. 154(b) by 271 days.

(21) Appl. No.: 11/239,586

(22) Filed: Sep. 29, 2005

(65) Prior Publication Data

US 2006/0082185 A1    Apr. 20, 2006

(30) Foreign Application Priority Data

Oct. 1, 2004   (DE) ...................... 10 2004 048 405

(51) Int. Cl.
    *B60J 7/20* (2006.01)
(52) U.S. Cl. ................................. 296/107.08
(58) Field of Classification Search ........... 296/107.01, 296/107.08, 136.05
    See application file for complete search history.

(56) References Cited

U.S. PATENT DOCUMENTS

| | | | |
|---|---|---|---|
| 5,921,608 A * | 7/1999 | Schmitt et al. | 296/107.08 |
| 6,318,792 B1 * | 11/2001 | Neubrand et al. | 296/107.08 |
| 6,364,396 B1 * | 4/2002 | Hayashi et al. | 296/136.06 |
| 6,454,343 B1 * | 9/2002 | Wagner et al. | 296/107.08 |
| 6,663,163 B2 * | 12/2003 | Koch | 296/107.08 |
| 6,682,149 B1 * | 1/2004 | Guillez et al. | 296/108 |
| 6,742,829 B2 * | 6/2004 | Reihl | 296/108 |
| 7,032,947 B2 * | 4/2006 | Queveau et al. | 296/24.44 |
| 2003/0020296 A1 * | 1/2003 | Koch et al. | 296/107.08 |
| 2003/0020297 A1 * | 1/2003 | Koch | 296/107.08 |
| 2003/0020298 A1 * | 1/2003 | Koch | 296/107.08 |
| 2005/0077750 A1 * | 4/2005 | Queveau et al. | 296/107.08 |
| 2007/0182200 A1 * | 8/2007 | Baumeier et al. | 296/107.08 |

FOREIGN PATENT DOCUMENTS

| | | |
|---|---|---|
| DE | 10132547 | 1/2003 |
| DE | 10134370 | 1/2003 |

* cited by examiner

*Primary Examiner*—H Gutman
(74) *Attorney, Agent, or Firm*—Brooks Kushman P.C.

(57) ABSTRACT

A kinematic system is proposed for adjusting a side flap of a cover assembly for a vehicle with an openable roof, the kinematic system being adjustable between a covered position and a stored position, and the kinematic system being designed in such a way that the side flap undergoes at least one translational motion and at least one rotational motion during the adjustment, and characterized in that the kinematic system has a four-bar linkage kinematic mechanism for the translational motion and a guide track for the rotational motion.

17 Claims, 4 Drawing Sheets

COVER ASSEMBLY FOR AN OPENABLE ROOF WITH AN ADJUSTABLE LINKAGE FOR A SIDE FLAP

BACKGROUND OF THE INVENTION

1. Field of the Invention

The invention relates to a kinematic system for adjusting a side flap of a cover assembly for vehicles with an openable roof. Alternatively, the invention relates to a cover assembly having adjustable side flaps and a kinematic system for adjusting the side flaps.

2. Background Art

Convertible top and retractable hardtop equipped vehicles frequently have a cover, or tonneau, that conceals all or part of the top when it is stored in a storage compartment. Many different designs for such covers have been developed. A short summary of several different designs that are disclosed in published patent applications is provided below.

German published patent application DE 102 22 189 A1 discloses a cover assembly having a middle section and two slide flaps associated with this middle section. The side flaps are supported on the middle section by a rotary bearing. By means of this rotary bearing, the side flaps can be lowered from a position in which together with the middle section they form a flat cover, and then by a pivoting motion can be stored underneath the middle section.

German published patent application DE 100 51 615 A1 discloses a cover assembly for vehicles with an openable roof, having two pivotable side flaps. The side flaps are pivotably linked to the middle section by a swing arm. A common motor for both side flaps is used as a power source for the pivoting motion.

Published PCT patent application WO 01/45976 discloses a further cover assembly having a middle section and two side flaps. The side flaps are disposed on a pivot axis which is parallel to the transverse axis of the vehicle and situated below the middle section. The side flaps can be adjusted by means of a suitable sliding guide from a horizontal position (viewed in the orientation of the vehicle) in which, together with the middle section, they form a flat cover to a position downward and to the rear of the middle section in an oblique stored position.

Applicants' invention is intended to improve on the above designs as summarized below.

SUMMARY OF THE INVENTION

One aspect of the present invention is to provide a system that follows a defined motion sequence for a lateral rotation of side flaps of a cover assembly for a vehicle with an openable roof that avoids collisions with other components as the side flaps are rotated.

The position of the side flaps is adjusted by the kinematic system as they are moved to the kinematic system between a covered position and a stored position. A side flap coupled undergoes at least one translational motion and at least one rotational motion as it is moved between the covered position and the stored position. In this patent application, "motion" is understood to mean a motion component or a plurality of superimposed motion components.

The kinematic system has a four-bar linkage for the translational motion. The rotational motion of the kinematic system is constrained by a first guide track. The four-bar linkage and guide track of the kinematic system actuates the side flap in a controlled manner to undergo a controlled motion along a predefined path of motion. The translational and rotational motions may be advantageously combined with one another to avoid contact with other components. For example, a translational motion may be used to move the side flap away from nearby components. After the side flap is moved by the translational movement, the side flap may be folded in, unobstructed, by the rotational motion.

In one embodiment of the invention, the first guide track runs partly in a curved line and partly in a straight line. The partly curved portion of the guide track may be used to define the rotational motion of the kinematic system or the side flap that is coupled to the kinematic system. The first guide track may have a circular curvature. The first guide track may also lie in one imaginary plane. The side flap moves in a flat pivoting motion due to the structure of the guide track.

In a further embodiment of the invention, the kinematic system has a connecting plate and a base plate that is mounted to the connecting plate to be rotatable about a rotational axis. The connecting plate and the base-plate may be pivoted relative to one another. This pivoting motion may be used for adjusting the side flap.

The side flap may be connected to the base plate by a connecting plate. The connecting plate may contain the first guide track. For example, movement of the base plate relative to the connecting plate may be carried out on the first guide track on the connecting plate. The midpoint of the guide track on the connecting plate may have a circular curvature that lies on the rotational axis on which the base plate is rotatably mounted relative to the connecting plate.

In a further embodiment, the first guide track may have a bend. The curved portion and the straight portion of the first guide track may merge together at the bend. An object sliding along the guide track may first be guided in a straight-line path, and after passing the bend may be guided in a curved or circular path, or vice versa.

In a further embodiment, the kinematic system may have a second guide track that extends in a straight line. The base plate of the kinematic system may contain the second guide track.

The second guide track may be oriented in a specific rotational position of the base plate relative to the connecting plate, overlapping with the straight-line path defining portion of the first guide track on the connecting plate. A guide pin may be used to guide an object in the first and in the second guide tracks. The base plate overlaps to the connecting plate so that the guide pin may be guided along the first and second guide tracks in a straight line. The bend in the first guide track on the connecting plate is located within the overlapping, mutually linear region of the first and second guide tracks.

The two guide tracks may overlap so that one end of the second guide track is situated in the region of the bend in the first guide track to form a stop for the guide pin. It may be possible to guide the guide pin in the first and second guide tracks from the side of the second path of motion located away from the bend toward the bend in the first path of motion. The guide pin in the overlapping straight-line courses of the first and second paths of motion advantageously results in the loss of one degree of freedom. The guide pin and the inner surfaces of the paths of motion may contact one another in such a way that rotation of the connecting plate relative to the base plate is prevent.

Relative rotational motion between the base plate and the connecting plate is possible when the guide pin is located at the bend in the first guide track on the connecting plate. From this point on, the guide pin may be guided along the circular track on the connecting plate.

Displacement of the guide pin within the second straight-line guide track on the base plate may be precluded. The first guide track with a circular curvature may also have the same number of degrees of freedom. The previously described translational degree of freedom of the guide pin results in a rotational degree of freedom of the base plate relative to the connecting plate by which the guide pin is coupled to the guide tracks. In this region, the guide pin is not able to travel in translational straight-line motion, but, rather, only on a circular path.

In one embodiment of the invention, the kinematic system has a drive. The drive may be, for example, an electric motor, pneumatic system, hydraulic system, and/or any other mechanical energy source. The drive is provided to move the kinematic system or the side flap that is coupled to the kinematic system.

The drive may be coupled to the guide pin constrained in the first and second guide tracks on the connecting plate and base plate. The coupling may be achieved, for example, by a drive arm that is coupled to the disk cam and has a catch. The disk cam may be associated with a shaft of the drive. The driven guide pin may be coupled to a four-bar linkage of the kinematic system. The four-bar linkage of the kinematic system may also be adjusted by means of the constrained guide pin. The four-bar linkage may be coupled to the side flap. The drive for the four-bar linkage may, for example, produce a superimposed translational motion, characteristic of four-bar linkages, in two spatial directions relative to the side flap. The motion may be superimposed with a tilting motion, depending on the design of the control arm for the four-bar linkage. The side flap may be moved by this translational motion away from parts with which it may be susceptible to collision.

In a further embodiment, the catch for the disk cam may have a stop. The stop may strike against the base plate to transmit torque from the drive on the base plate. The coupling for the drive and the four-bar linkage, or for the guide pin and the four-bar linkage, is designed so the catch precisely strikes against the base plate when the constrained guide pin is located at the bend in the first guide track on the connecting plate. As previously described, at this location the motion of the guide pin changes to a rotational or circular motion.

The guide pin is able to move within the circular course of the first guide track only when the base plate is simultaneously co-rotating relative to the connecting plate due to the jamming of the guide pin within the first and second guide tracks. Jamming of the pin creates frictional forces between the first guide track on the connecting plate and the guide pin. These frictional forces may be reduced by the drive transmitting a torque to the base plate via the catch striking against the base plate. The guide pin is constrained within the first and second guide tracks and moves relatively freely due to the rotational motion of the base plate produced by the drive. The drive may be directly or indirectly coupled to the connecting plate for transmitting torque to the base plate.

The cover apparatus may have a middle section and two side flaps that are planarly adjoining in a covered position. In a vehicle with an openable roof, in particular a convertible, the side flaps are used to cover components that are normally concealed but which become visible when the roof is in the open position. In vehicles with a lowerable C-pillar, the side flaps may cover the space that is uncovered by the C-pillar in the lowered position.

When the C-pillars are not lowered, it is necessary for the vehicle interior to be only partially covered by the middle section of the cover assembly. When the C-pillars are lowered, the additional uncovered space may be covered by the side flaps of the cover assembly. The side flaps can be adjusted from the covered position, in which together with the middle section they form a flat cover, into a stored position. In the stored position, the side flaps are stowed by the kinematic system in such a way that they uncover the space occupied by the C-pillars in the non-lowered state.

Further advantages and useful embodiments are contained in the additional claims, the description of the figures, and the drawings, which show the following:

DETAILED DESCRIPTION OF THE PREFERRED EMBODIMENT(S)

In the figures, identical parts are provided with the same reference numbers.

Figure 1:
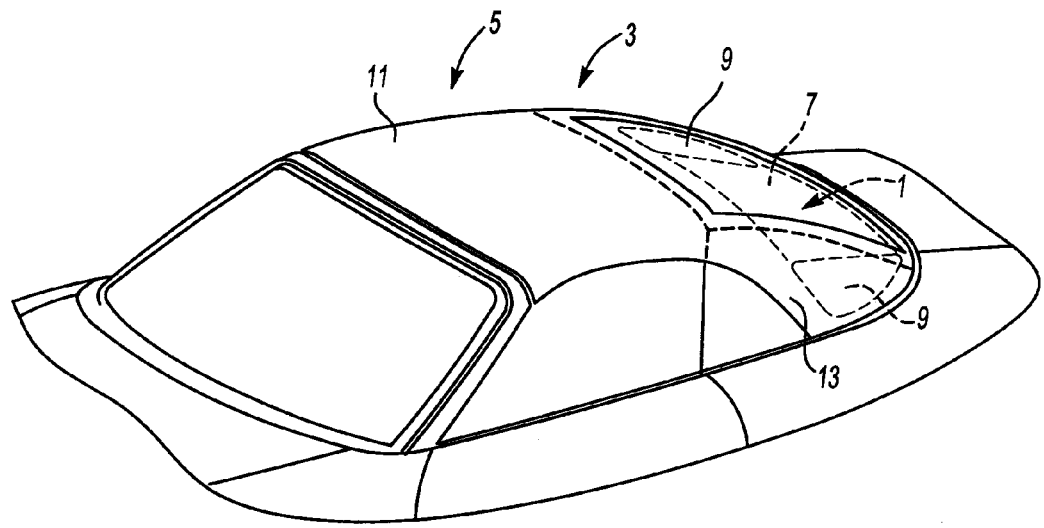
FIG. 1 is a perspective upper diagonal view of a section of a vehicle with an openable roof having a cover assembly made according to the invention.

FIG. 1 shows a cover assembly 1 for an adjustable roof 3, either a hardtop or a soft-top, of a partially illustrated vehicle 5. The cover assembly 1 has a middle section 7 and two side flaps 9 that are in generally the same plane and are adjacent to the middle section. The roof 3 of the vehicle 5 may be adjusted between a closed position and a folded-away position. The roof 3 is illustrated in a closed position in FIG. 1. The cover assembly 1 of the vehicle 5 may also serve as a rear shelf when the roof 3 is in the closed position.

The vehicle 5 also has C-pillars 13 that may be lowered. The C-pillars 13 may be moved independently or together with the roof 3 to a stored position inside the vehicle 5. It is desirable to cover the roof 3 with the cover assembly 1 when the roof 3 is folded. Lowering of the C-pillars 13 may create a space that may also be covered by the cover assembly 1. The side flaps 9 are designed to be adjustable between a covered position planarly adjacent to the middle section 7 and a stored position. The cover assembly 1 is flexibly designed to hide from view functional parts of the roof 3, in the closed state of the roof 3, in the partially opened state, i.e., with the roof section stored and the C-pillar not lowered, and also when the C-pillar is stored.

Figure 2:
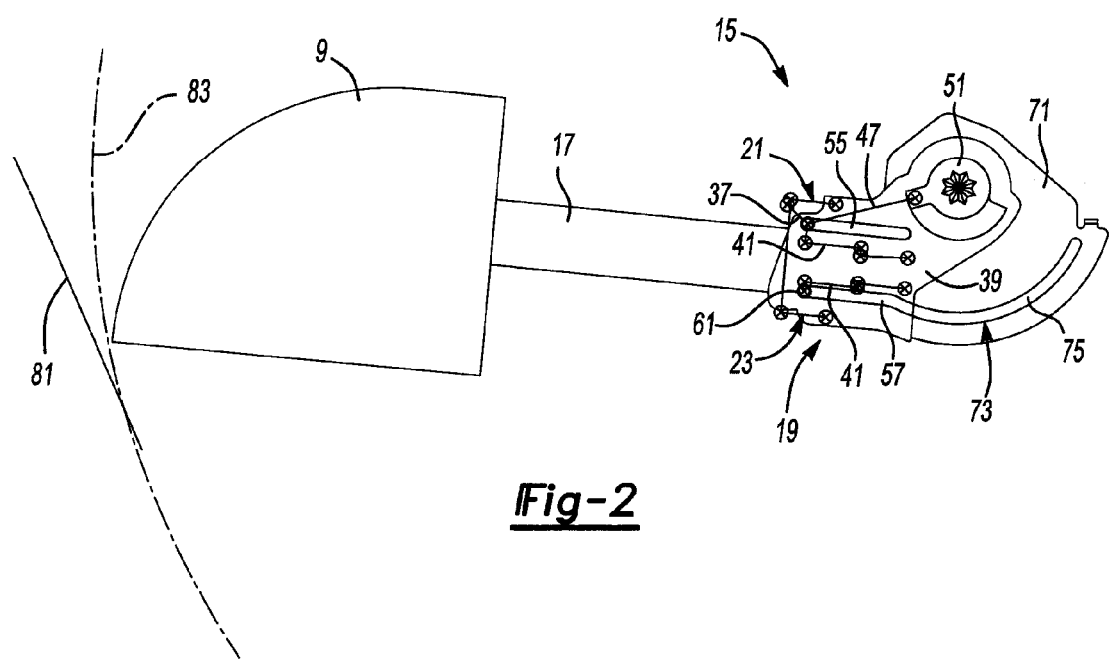
FIG. 2 is a top view of a kinematic system with a side flap coupled thereto in the covered position.
Figure 3:
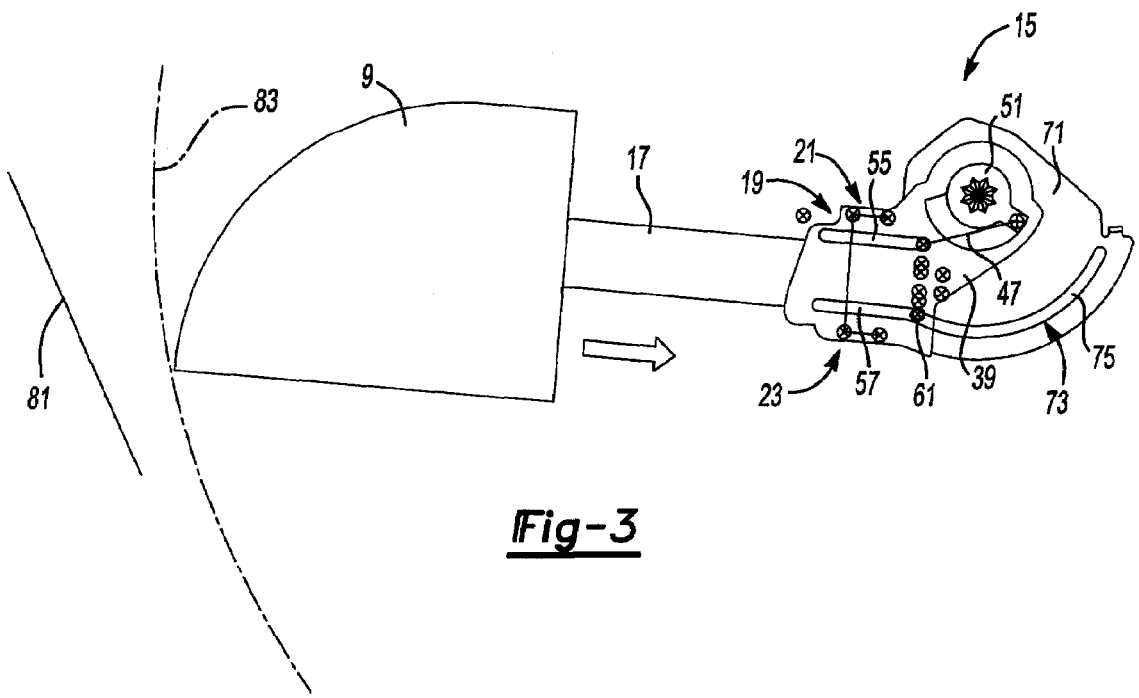
FIG. 3 is a top view of the kinematic system and the side flap shown in FIG. 2 with the side flap in an elevated intermediate position.
Figure 4:
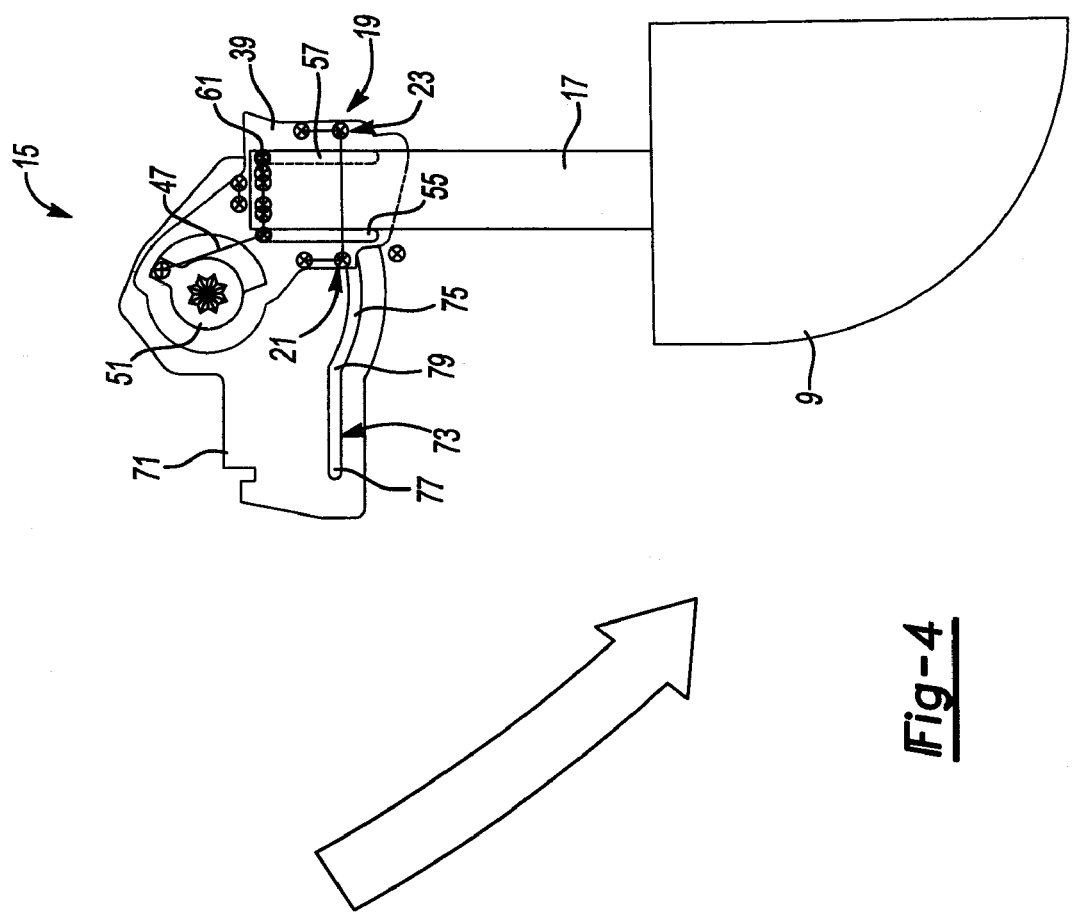
FIG. 4 is a top view of the kinematic system with the side flap shown in FIGS. 2 and 3 in a stored position in the pivoted state.
Figure 4:
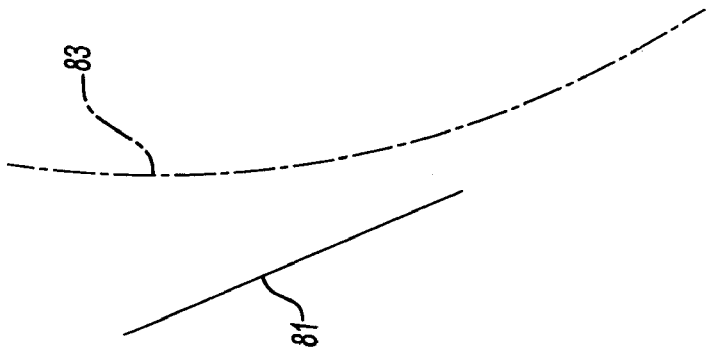

FIGS. 2 through 4 show a schematic top view of a kinematic system 15 that is coupled to one of the side flaps 9 in various functional positions.

The kinematic system 15 is connected via a lever 17 to the side flap 9. The lever 17 is connected to a four-bar linkage kinematic mechanism 19 for linking the kinematic system 15 to the side flap 9. As shown in FIGS. 2-6, the four-bar linkage kinematic mechanism 19 has a first four-bar linkage 21 and a second four-bar linkage 23. The four-bar linkages 21 and 23 of the kinematic mechanism 19 may be symmetrical with respect to one another. For the sake of simplicity, corresponding articulated joints of the four-bar linkages 21 and 23 are denoted by identical reference numbers. Each of the four-bar linkages 21 and 23 has first through fourth articulated joints 25 through 31. The articulated joints 25 through 31 of the four-bar linkages 21 and 23 are kinematically coupled to one another via corresponding control arms.

In the present case, a control arm 33 is provided for connecting each of articulated joints 25 and 27. Articulated joints 29 and 31 are each connected by a control arm 35.

The coupling or synchronization of the symmetrically opposed articulated joints 25 and 29 is necessary for the function of the four-bar linkages 21 and 23. The required coupling or synchronization is provided via a lateral arm 37 and the lever 17 of the kinematic system 15. The lateral arm 37 is rigidly connected in each case to the articulated joints 25 of the two four-bar linkages 21 and 23 of the four-bar linkage kinematic mechanism 19. The lateral arm 37 is also associated with the lever 17. The motions of the articulated joints 25 of the four-bar linkages 21 and 23 are transmitted to the lever 17 via the lateral arm 37. The articulated joints 29 of the four-bar linkages 21 and 23 are likewise associated with the lever 17. The articulated joints 25 and 29 of the four-bar linkages 21 and 23 are kinematically coupled to one another via the lateral arm 37 and the lever 17.

Optionally, a corresponding control arm could also be used instead of the coupling just described. The articulated joints 27 and 31 of the two four-bar linkages 21 and 23 are each associated with a base plate 39 of the kinematic system 15. The articulated joints 27 and 31 are kinematically coupled to one another via the base plate 39.

One drive arm 41 is provided in each case for driving the four-bar linkages 21 and 23. The drive arms 41 for the four-bar linkages 21 and 23 are each associated with the articulated joints 29 of the four-bar linkages. The association is made in each case via a first drive joint 43 associated with the lever 17. In addition, the drive arms 41 are each coupled to a second drive joint 45. The drive joints 45 in turn are connected to an eccentric arm 47. The eccentric arm 47 is also associated with an eccentric catch 49 of a rotatably mounted disk cam 51. The eccentric arm 47 is associated with the catch 49 on the disk cam 51 by means of an eccentric joint 53.

The eccentric arm 47 associated with the drive arms 41 via the second drive joint 45 is also associated with a first guide track 55 and a second guide track 57. The association of the eccentric arm 47 with the guide tracks 55 and 57 is similarly made via a first guide pin 59 and a second guide pin 61. The guide pins 59 and 61 engage the guide tracks 55 and 57 in such a way that a rotational motion of the catch 49 of the disk cam 51 is transformed via the eccentric arm 47 into a guided translational motion of the guide pins 59 and 61 in the guide tracks 55 and 57. Rotational motion of the disk cam 51 results in a translational motion of the second drive joints 45 of the drive arms 41 which are coupled to the guide pins 59 and 61.

The base plate 39 has a curved recess 63 in which the catch 49 on the disk cam 51 is able to move freely. The catch 49 on the disk cam 51 has a stop 65 which can strike against a counterstop 67 on the base plate 39. In addition, the disk cam 51 has a torque interface 69, for example a gearing or hub, which can be coupled to a drive (not shown) that is preferably fixed to the connecting plate 71, for transmitting a torque to the disk cam 51.

The base plate 39 is relatively rotatable with respect to the connecting plate 71 of the kinematic system 15. The drive (not shown) or the disk cam 51 coupled thereto is similarly rotatably mounted coaxial to this common rotational axis.

The connecting plate 71 has a guide track 73 that comprises a curved first section 75 and a second straight-line section 77. In the illustration according to FIGS. 2 and 2A, the second straight-line section 77 of the guide track 73 on the connecting plate 71 is visible only through the second guide track 57 on the base plate 39.

The second guide pin 61 for the kinematic system 15, which is associated with the eccentric arm 47, extends through both the guide track 73 on the connecting plate 71 and the second guide track 57 on the base plate 39. Thus, the second guide pin 61 is supported or guided in the same way in the two guide tracks 57 and 73.

Figure 5:
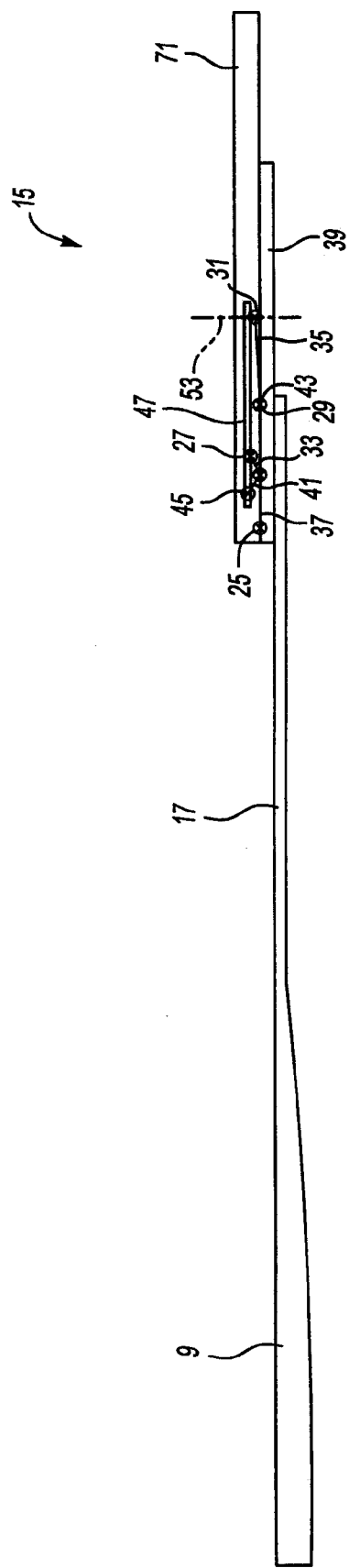
FIG. 5 is a schematic side view of the kinematic system and side flap shown in FIG. 1.
Figure 6:
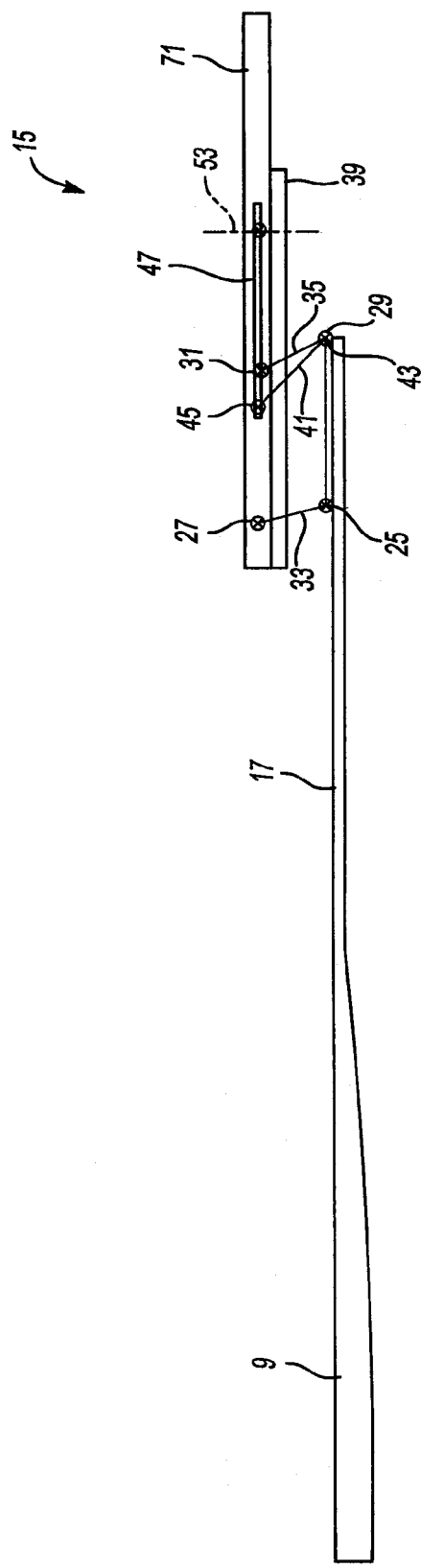
FIG. 6 is a schematic side view of the kinematic system and side flap shown in FIG. 3.

FIGS. 5 and 6 each show a schematic side view of the kinematic system 15 together with the side flap 9. The side view shown in FIG. 5 corresponds to the functional position of the kinematic system 15 depicted in FIG. 2. The side view shown in FIG. 6 corresponds to the functional position of the kinematic system 15 illustrated in FIG. 3. The mode of operation of the kinematic system 15 is described in greater detail below, with reference to FIGS. 2 through 6.

Figure 2A:
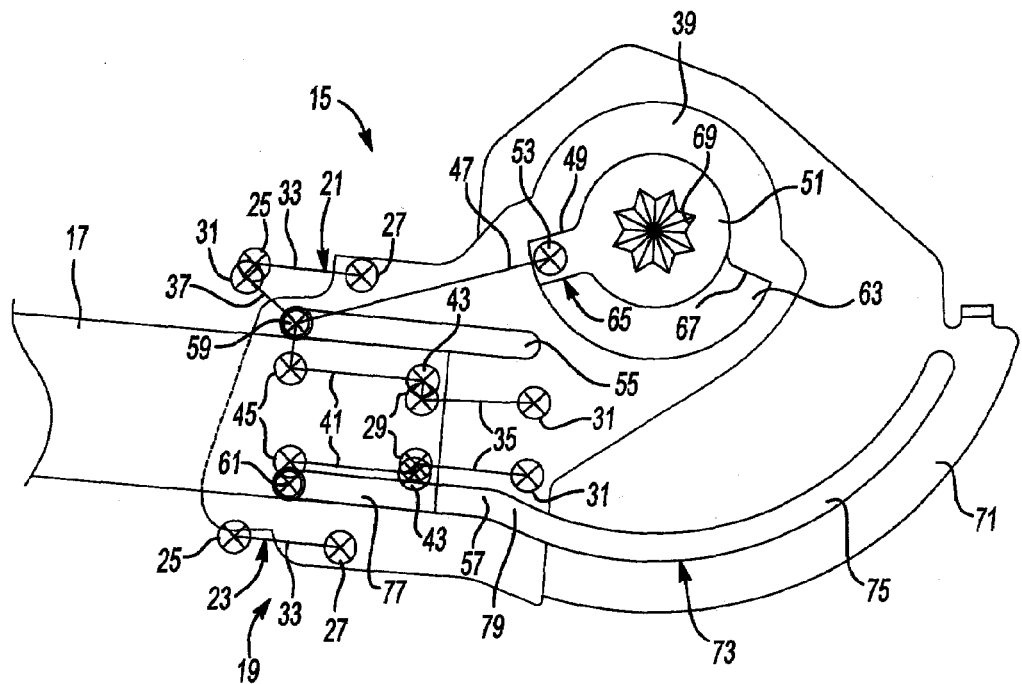
FIG. 2A is a fragmentary enlarged top plan view of the kinematic system shown in FIG. 2.

In a first functional position as shown in FIG. 2A, the catch 49 of the disk cam 51 is located at a front end of the recess 63 in the base plate 39. In this position, the catch 49 and the coupling of the eccentric arm 47 forces the guide pins 59 and 61 inside the guide tracks 55, 57. As can be seen in FIG. 5, in this first functional position the four-bar linkages 21 and 23 of the kinematic system 15 are folded in.

As seen in the orientation of FIGS. 2 and 5, the lever 17 and the side flap coupled to the lever 17 are extended to the left. This first functional position corresponds to the covered position of the cover assembly 1. In this state, as shown in FIGS. 2 and 5, the side flap 9 may be brought into bearing contact with additional vehicle parts, such as a connection to rear side trim and/or sealing parts. The rear side trim is indicated by a line 81 in FIGS. 2 through 4.

In order to fold in the side flap 9, it is necessary to first move the side flap 9 away from the adjacent components, such as the rear side trim, or sealing parts (not shown here) in bearing contact with the side flap 9. This may be advantageously achieved by a translational and/or tilting motion produced by the four-bar linkages 21 and 23 of the kinematic system 15. The side flap 9 may be similarly lowered in the Z direction and pulled back in the direction toward the center of the vehicle by means of the four-bar linkages 21 and 23. This intermediate position is illustrated in FIGS. 3 and 6.

The side flap 9 may be pivoted by the kinematic system 15 in a last motion step together with the lever 17. The outer perimeter of the pivoting motion is indicated by a dashed-dotted line 83 in FIGS. 2 through 4. It can be seen that lines 81 and 83 intersect in the illustration according to FIG. 2. A rotational motion starting from the position as shown in FIG. 2 would thus result in a collision of the side flap 9 with the rear side trim indicated by the line 81. In the illustration according to FIGS. 3 and 4, the dashed-dotted line corresponds to the circumference of the rotational motion of the side flap 9 actually created by the kinematic system 15. The side flap 9 is moved away from the area susceptible to collision as a result of the translational motion produced by the four-bar linkages 21 and 23 of the kinematic system 15.

During the transition of the functional position, as shown in FIG. 2, to the intermediate functional position, as shown in FIG. 3, the disk cam 51 is rotated in a counterclockwise direction relative to the base plate 39 in the orientation of FIGS. 2 through 4. The rotational motion continues until the stop 65 on the disk cam 51 strikes against the counterstop 67 on the base plate 39. This rotational motion induces through the eccentric arm 47 the previously described translational motion of the guide pins 59 and 61 inside the guide tracks 55, 57, 73 on the base plate 39 and the connecting plate 71. The rotational motion acts through the drive arms 41 to cause the four-bar linkages 21 and 23 to lift.

The recess 63 on the base plate 39 is dimensioned such that the stops 67 and 65 make precise bearing contact when the guide pins 59 and 61 have moved completely to the right—as viewed in the orientation of FIGS. 2 through 4—inside the guide tracks 55, 57 and 73. This position is shown in FIGS. 3 and 6. In this intermediate position the second guide pin 61 is located exactly at the bend 79 in the guide track 73 on the connecting plate 71.

As long as the second guide pin 61 is located outside the bend within the straight-line sections of the guide tracks 57 and 73, any possible relative rotational motion between the base plate 39 and the connecting plate 71 is blocked. This blockage is not released until the second guide pin 61 is located at the bend 79 in the guide track 73 on the connecting plate 71. At the bend 79, the guide track 73 changes to a circular path which revolves about the common rotational axis of the base plate 39 and the connecting plate 71.

In FIG. 6 it can be seen that the drive arm 41 is moved by the eccentric arm 47 to cause the four-bar linkages 21 an 23 to be lifted on account of the couplings.

In a last motion step, the base plate 39 together with the lifted four-bar linkages 21 and 23 and the side flap 9 that is coupled to the lever 17 and may be pivoted relative to the connecting plate 71. The torque necessary for this motion is transmitted via the drive arm 41 and the catch 49 on the disk cam 51, which strikes against the base plate 39 via the stops 65 and 67. The second guide pin 61 slides along the guide track 73 on the connecting plate 71 until it strikes against the right end of the guide track 73, as viewed in the orientation of FIGS. 2 through 4. This end position is shown in FIG. 4.

If the system jams when the guide pin 61 is located in the first section 75 of the guide track 73 on the connecting plate 71, the guide pin 61 does not prevent the desired rotational motion, but instead causes an undesired resetting of the four-bar linkages 21 and 23 of the kinematic system 15. As shown in FIG. 4, displacement of the guide pin 61 within the second guide track 57 on the base plate 39 results in an abandonment of the circumscribed perimeter defined by the first section 75 of the guide track 73. Thus, the four-bar linkages 21 and 23 are blocked in all intermediate positions between the positions shown in FIGS. 3 and 4 by the second guide pin 61 and the drive arm 41 coupled thereto.

The connecting plate 71 may be fixed to the vehicle 5 by suitable fixing means, for example, three screws and corresponding boreholes. Appropriate adjusting means may also be provided. The connecting plate 71 may be advantageously fixed to a rear cover of the vehicle 5, not illustrated here. A pivoting motion described by the kinematic system 15 may thus result in a desired shifting of the side flaps 9, so that in the position shown in FIG. 4 the side flaps may be stored flat underneath the rear cover.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A kinematic system for adjusting a side flap of a cover assembly for a vehicle with an openable roof, the kinematic system being adjustable between a covered position and a stored position, and the kinematic system comprising:
   a four-bar linkage that moves the side flap in at least one translational motion; and
   a guide track that moves the side flap in at least one rotational motion.

2. The kinematic system according to claim 1, wherein the guide track has a first curved section and a second straight-line section.

3. The kinematic system according to claim 2, wherein the first curved section of the guide track has a circular curvature.

4. The kinematic system according to claim 3, wherein the guide track runs in one imaginary plane.

5. The kinematic system according to claim 1, wherein the kinematic system has a connecting plate and a base plate rotatably mounted to the connecting plate.

6. The kinematic system according to claim 5, wherein the connecting plate contains the guide track.

7. The kinematic system according to claim 6, wherein the guide track having has a curved section having a circular curvature on the connecting plate and further wherein the midpoint of the guide track is located on a rotational axis of the base plate.

8. The kinematic system according to claim 7, wherein the guide track has a bend.

9. The kinematic system according to claim 8, wherein a first curved section of the guide track and a second, partly straight-line course of the guide track merge together at the bend.

10. The kinematic system according to claim 9, where in the kinematic system has a second guide track which runs in a straight line.

11. The kinematic system according to claim 10, wherein the base plate contains the second guide track.

12. The kinematic system according to claim 11, wherein the second guide track is oriented in a specific rotational position of the base plate relative to the connecting plate, and further wherein the second guide track overlaps with the partly straight-line section of the guide track on the connecting plate.

13. The kinematic system according to claim 12, wherein the kinematic system has a guide pin which engages in the guide track on the connecting plate and which engages in the second guide track on the base plate.

14. The kinematic system according to claim 13, wherein the guide tracks are configured with at least one bearing surface that limits the guide pin to traversing only a constrained path which changes from a straight-line motion to a circular motion.

15. The kinematic system according to claim 14, wherein the kinematic system has a drive which is coupled to a second guide pin via a disk cam having a catch, which is coupled to an eccentric joint via an eccentric arm.

16. The kinematic system according to claim 15, wherein the second guide pin is coupled by a drive arm to a four-bar linkage kinematic mechanism, the drive arm driving the four-bar linkage kinematic mechanism.

17. A cover assembly for vehicles with an openable roof, the cover assembly comprising:

at least one middle section;

two side flaps that are adjustable between a covered position and a stored position, the side flaps in the covered position together with the middle section forming a flat cover; and a kinematic system linking the side flaps to the middle section, the kinematic system having at least one four-bar link for moving the side flaps in a linear direction, and a curved guide track for moving the side flaps in a rotational motion.

* * * * *